United States Patent [19]

Schönfelder et al.

[11] Patent Number: 5,075,091

[45] Date of Patent: Dec. 24, 1991

[54] PROCESS FOR THE PREPARATION OF SILICON NITRIDE

[75] Inventors: Lothar Schönfelder; Gerhard Franz, both of Krefeld, Fed. Rep. of Germany

[73] Assignee: Bayer Aktiengesellschaft, Leverkusen, Fed. Rep. of Germany

[21] Appl. No.: 409,275

[22] Filed: Sep. 19, 1989

Related U.S. Application Data

[63] Continuation of Ser. No. 915,377, Oct. 6, 1986, abandoned.

[30] Foreign Application Priority Data

Apr. 11, 1986 [DE] Fed. Rep. of Germany ....... 3612162

[51] Int. Cl.$^5$ ............................................ C01B 21/068
[52] U.S. Cl. ..................................................... 423/344
[58] Field of Search ......................................... 423/344

[56] References Cited

U.S. PATENT DOCUMENTS

| | | | |
|---|---|---|---|
| 4,122,152 | 10/1978 | Mori et al. | 423/344 |
| 4,414,190 | 11/1983 | Seimiya et al. | 423/344 |
| 4,613,490 | 9/1986 | Suzuki et al. | 423/344 |
| 4,619,905 | 10/1986 | Natansohn et al. | 423/344 |

FOREIGN PATENT DOCUMENTS

| | | | |
|---|---|---|---|
| 0080050 | 6/1983 | European Pat. Off. | |
| 2528170 | 1/1977 | Fed. Rep. of Germany . | |
| 2818545 | 11/1978 | Fed. Rep. of Germany . | |
| 0024300 | 2/1979 | Japan | 423/344 |
| 0069705 | 4/1983 | Japan | 423/344 |
| 0122706 | 7/1985 | Japan | 423/344 |
| 1579417 | 11/1980 | United Kingdom . | |

OTHER PUBLICATIONS

K. Kijima et al, J. Am. Ceram. Doc., vol. 56, No. 6 (1973), p. 346.
W. Li et al, Ceramic Powders, ed. by P. Vincenzini, 1983, pp. 403–412.
Chem. Abstract 85/35197 (=JP 76/28599).

*Primary Examiner*—Olik Chaudhuri
*Assistant Examiner*—Kenneth Horton
*Attorney, Agent, or Firm*—Connolly & Hutz

[57] ABSTRACT

The process of preparing silicon nitride is improved by reacting silicon-oxygen compounds and a carbon-containing material in an ammonia or ammonia/nitrogen atmosphere at 1300° to 1600° C.

6 Claims, No Drawings

PROCESS FOR THE PREPARATION OF SILICON NITRIDE

This application is a continuation of application Ser. No. 915,377, filed Oct. 6, 1986, now abandoned.

The present invention relates to a process for the preparation of silicon nitride powder by the reaction of silicon-oxygen compounds and a material containing carbon in a nitriding atmosphere.

BACKGROUND OF THE INVENTION

Silicon nitride powder is an interesting raw material for the production of ceramic materials which are to be exposed to severe mechanical and thermal conditions.

Silicon nitride powder used as raw material for the production of ceramic materials for high temperature uses are required to meet high standards of chemical purity and contain a high proportion of $\alpha$-$Si_3N_4$.

If ceramic $Si_3N_4$ materials contain a high proportion of metallic or non-metallic impurities such as oxygen or carbon, their high temperature properties are impaired.

A high proportion of $\alpha$-$Si_3N_4$ to $\beta$-$Si_3N_4$ in the raw materials is advantageous for the sintering properties and promotes the formation of a dense microstructure in the finished material.

The following are the most important processes for the production of silicon nitride powder:
(1) direct nitridation of silicon with nitrogen;
(2) the reaction of $SiCl_4$ with ammonia;
(3) carbothermal nitridation of $SiO_2$ in the presence of carbon.

Among these processes, carbothermal nitridation of $SiO_2$ (3) is of particular interest for large scale industrial production.

Direct nitridation of silicon with nitrogen (1) is an exothermic reaction which requires accurate control of the reaction process if powders containing a high proportion of $\alpha$-$Si_3N_4$ are to be obtained.

The process employing the reaction of $SiCl_4$ with ammonia (2) has the disadvantage that it requires the use of expensive raw materials, such as $SiCl_4$, and that substantial quantities of by-products, such as HCl and $NH_4Cl$, are formed in addition to the silicon nitride. This process is therefore less suitable for the production of a silicon nitride powder at an economical cost.

The process of carbothermal nitridation (3), on the other hand, has the advantage of being particularly interesting for large scale industrial production of $Si_3N_4$ because the reaction is simple and the $SiO_2$ raw material is inexpensive and readily available.

If the process (3) is to be employed on an industrial scale, however, it has the disadvantage that reactions between solids, in this case $SiO_2$ and carbon, and gases depend to a large extent on the reaction velocity of diffusion processes. The diffusion of gas is considerably impeded if the reaction mixtures form a high dumping height, and the reaction conditions are then adversely affected. Carbothermal nitridation therefore requires long reaction times and high reaction temperatures if adequate nitridation rates are to be achieved.

Various processes have been proposed to overcome these disadvantages.

Japanese Patent Application 76/28599 describes a method of accelerating the carbothermal nitridation reaction by the addition of oxides of the elements iron, aluminium, calcium and magnesium to a mixture of amorphous $SiO_2$ and carbon.

Also European Patent Application 80,050 describes a method of increasing the $\alpha$-$Si_3N_4$ content by the addition of compounds of alkaline earth metals or transition elements.

These processes, however, are not suitable for the production of highly pure silicon nitride powder because the compounds added severely contaminate the powder obtained, especially with elements such as calcium, iron or aluminium which impair the high temperatures strength of $Si_3N_4$ materials.

It was thus an object of the present invention to provide a process for the production of silicon nitride which would not have the disadvantages described above.

BRIEF DESCRIPTION OF THE INVENTION

It has now surprisingly been found that an addition of ammonia to the nitrogen gas used for nitridation accelerates the nitridation reaction without impairing the product quality of the silicon nitride.

DETAILED DESCRIPTION

The present invention thus relates to a process for the preparation of silicon nitride powder by the reaction of silicon-oxygen compounds and material containing carbon in a nitriding atmosphere, wherein the said nitriding gas atmosphere comprises ammonia gas or mixtures of ammonia and nitrogen gases with the reaction being carried out at temperatures from 1300° to 1600° C.

The factor which decisively influences the nitriding and reaction-accelerating action of gaseous ammonia is the method according to the invention by which the gas is brought into contact with the solid reaction mixture of $SiO_2$ and carbon. If the temperature employed for nitridation are kept within the limits of 1300° to 1600° C., the formation of unwanted silicon carbide is avoided. Furthermore, silicon nitride powders containing a high proportion of the $\alpha$-phase is obtained by the process according to the invention.

The embodiment of the process according to the invention in which the reaction temperatures are maintained within the range of 1400° to 1500° C. is particularly preferred. Temperatures below 1300° C. generally result in poor rates of nitridation while temperatures above 1560° C. result in increased formation of SiC as well as $\beta$-$Si_3N_4$.

The process according to the invention is preferably carried out in such a manner that the nitriding atmosphere contains from 10 to 100 volume percent of ammonia gas.

It has further been found that the nitriding action of ammonia under the reaction conditions is particularly advantageous if the dwell time of the gas in the hot reaction zone before it comes into contact with the reaction mixture is kept very short.

The process according to the invention is, therefore, preferably carried out in such a manner that the dwell time of the ammonia gas is less than one second. The preferred dwell time of the ammonia gas in the reaction zone at temperatures above 1400° C. is in the range of 0.5 to 0.01 second. At higher dwell times, the formation of SiC increases in favor of the formation of $Si_3N_4$.

The nitriding gas comprising ammonia or mixtures of ammonia and nitrogen can be passed directly over the reaction mixture at high flow velocities from ceramic gas inlet. The gas inlet means can conveniently be fabricated from materials such as $Si_3N_4$, SiC or $Al_2O_3$ or metals such as molybdenum and arranged so that the gases have only short dwell times in the hot zone.

According to one particularly preferred embodiment, the ammonia gas is introduced from the internal pipe of two concentric pipes in which the annular gap between the external and the internal pipe is cooled with a stream of inert gas, preferably nitrogen.

The raw materials for the preparation of the silicon nitride powder are mixed by known methods. The molar ratio of carbon to silicon compound should lie above the stoichiometric ratio of 2:1. An excess of carbon is advantageous for obtaining high nitridation rates and a high proportion of α-$Si_3N_4$, with the quantity of carbon used being preferably 2 to 3 times the stoichiometric quantity.

The silicon-oxygen compounds used may advantageously be quartz, amorphous $SiO_2$, organic silicon-oxygen compounds or mixtures thereof, while the materials containing carbon may be graphite, carbon black, organic compounds capable of carbonization or mixtures thereof. Quartz powder having specific surface areas according to BET in the range of 0.1 to 10 square meters per gram, determined by the nitrogen method, are particularly preferred.

Suitable sources of carbon are in particular carbon blacks, graphite, carbonizable organic compounds, or mixtures.

For obtaining high product quality, it is advisable to anneal the reaction product in an oxidizing atmosphere at 600° to 800° C. after the nitridation reaction in order to eliminate carbon.

Since the process according to the invention proceeds at a high reaction velocity without the addition of catalysts in solid form, the silicon nitride powder obtained is not contaminated by foreign substances. The chemical purity of the powder is, therefore, entirely determined by the raw materials put into the process. If highly pure types of quartz or, for example, hydrolysates of organic halogen-silicon compounds and commercially available highly purified gas carbon blacks are used, the silicon nitride powders obtained will have a correspondingly high degree of purity.

The process according to the invention is described in more detail in the following Examples which are not to be regarded as a limitation to the invention.

EXAMPLES 1-5

Finest quartz powder (specific surface area BET of 4.5 m²/g) and carbon black (specific surface area BET of 110 m²/g) were mixed dry in a molar ratio of 1:6 and granulated with the addition of a binder based on a polyvinyl alcohol. A fraction with particle diameters of 1 to 4 mm was obtained by screening. This mixture was introduced into a rotary convertor furnace at 1000° C. and heated to 1480° C. in one hour. The reaction mixture was kept under nitrogen gas during the initial heating phase. When the required temperature had been reached, nitridation was carried out in a nitrogen atmosphere with varying ammonia contents for 2 hours (Examples 1 to 4). In comparison Example 5, nitridation was carried out in a pure nitrogen atmosphere without the addition of ammonia. The total quantity of gas was 50 liters per hour. The dwell time of the gas in the heated zone was 0.07 seconds. After nitridation, the excess carbon was eliminated by annealing in air at 800° C. and the degree of conversion to $Si_3N_4$ was determined in each case (Table 1).

TABLE 1

| Example | $NH_3$ in the nitriding gas (vol. %) | Conversion to $Si_3N_4$ (%) |
|---|---|---|
| 1 | 30 | 39 |
| 2 | 50 | 62 |
| 3 | 80 | 75 |
| 4 | 100 | 84 |
| 5 (comparison example) | 0 | 16 |

EXAMPLES 6-10

A reaction mixture similar to that used in Examples 1 to 5 was nitrided for 2 hours in an atmosphere of $N_2$ and $NH_3$ mixed in proportions of 1:1. The degrees of conversion and the SiC content determined from the amount of carbon which cannot be burnt out are shown in Table 2.

TABLE 2

| Example | Reaction temperature (°C.) | Conversion to $Si_3N_4$ (%) | SiC content (%) |
|---|---|---|---|
| 6 | 1450 | 29 | 2.0 |
| 7 | 1475 | 83 | 4.2 |
| 8 | 1500 | 92 | 4.1 |
| 9 | 1525 | 83 | 12.4 |
| 10 (Comparison Example) | 1500 | 21 | 0.7 |

In Comparison Example 10, nitridation was carried out in a pure nitrogen atmosphere without the addition of ammonia.

EXAMPLES 11-15

The reaction mixture, prepared as in each of Examples 1 to 10, was nitrided under the conditions indicated in Table 3 and the degree of conversion, the carbon content of the $Si_3N_4$ powder and the α-$Si_3N_4$ content were determined.

The proportion of α-$Si_3N_4$ was determined by X-ray diffraction and calculated from the intensity ratio in accordance with the following equation $$\alpha - Si_3N_4 (\%) = \frac{\alpha - (102) + \alpha - (210)}{\alpha - (102) + \alpha - (210) + \beta - (101) + \beta - (210)} \times 100.$$

TABLE 3

| Example | Reaction temperature (°C.) | Reaction time (h) | Ammonia gas in nitridation gas (Vol. %) | Conversion to $Si_3N_4$ (%) | α-$Si_3N_4$ (%) | Carbon content (%) |
|---|---|---|---|---|---|---|
| 11 | 1480 | 2 | 100 | 94 | 98.4 | 0.3 |
| 12 | 1480 | 6 | 0 | 76 | 81.5 | 1.2 |
| 13 | 1500 | 2 | 50 | 93 | 96.0 | 0.6 |
| 14 | 1500 | 6 | 0 | 83 | 88.1 | 2.8 |
| 15 | 1525 | 2 | 50 | 83 | 98.8 | 12.4 |

What is claimed is:

1. In the process for the preparation of silicon nitride powder by the reaction of silicon-oxygen compounds and a material containing carbon in a nitriding atmosphere the improvement comprises the nitriding gas atmosphere containing 100 vol. % ammonia wherein the reaction is carried out at temperatures from 1400° to 1500° C. and the dwell time of the ammonia gas in the hot reaction zone before it contacts the reaction mixture is less than one second.

2. Process according to claim 1 wherein said dwell time at temperatures above 1400° C. is from 0.5 to 0.01 second.

3. Process according to claim 1 wherein the nitriding gas containing ammonia is introduced into the reaction zone through the inner pipe of two concentric pipes in which the annular gap between the outer pipe and the inner pipe is cooled by a stream of inert gas.

4. Process according to claim 3 wherein said inert gas is nitrogen.

5. Process according to claim 1 wherein the silicon-oxygen compounds are quartz, amorphous $SiO_2$, organic silicon-oxygen compounds or mixtures thereof and the material containing carbon is graphite, carbon black, carbonizable organic compounds or mixtures thereof.

6. Process according to claim 5 wherein the silicon-oxygen compound is quartz powder with specific surface areas according to BET of from 0.1 to 10 square meters per gram.